(12) United States Patent
Kojima et al.

(10) Patent No.: US 7,170,563 B2
(45) Date of Patent: Jan. 30, 2007

(54) TELEVISION RECEPTION APPARATUS

(75) Inventors: Hiroyuki Kojima, Kanagawa (JP); Takashi Hoshi, Tokyo (JP)

(73) Assignee: Sony Corporation, Tokyo (JP)

( * ) Notice: Subject to any disclaimer, the term of this patent is extended or adjusted under 35 U.S.C. 154(b) by 630 days.

(21) Appl. No.: 10/432,709

(22) PCT Filed: Sep. 26, 2002

(86) PCT No.: PCT/JP02/09974

§ 371 (c)(1),
(2), (4) Date: May 27, 2003

(87) PCT Pub. No.: WO03/030529

PCT Pub. Date: Apr. 10, 2003

(65) Prior Publication Data
US 2005/0099544 A1    May 12, 2005

(30) Foreign Application Priority Data
Sep. 28, 2001   (JP)   ............................. 2001-303547

(51) Int. Cl.
*H04N 5/46* (2006.01)
(52) U.S. Cl. ................. 348/556; 348/445; 348/581
(58) Field of Classification Search ........ 348/555–556, 348/558, 445, 568, 581; 382/232–238, 298, 382/299; 345/445, 670, 668; 386/131; *H04N 5/46*
See application file for complete search history.

(56) References Cited

U.S. PATENT DOCUMENTS 4,163,249 A * 7/1979 Michael et al. ............. 348/580

| 5,689,436 A | * | 11/1997 | Takeuchi | ............... 375/240.01 |
| 6,256,045 B1 | * | 7/2001 | Bae et al. | .................... 348/445 |
| 6,417,889 B1 | * | 7/2002 | Numata | ...................... 348/581 |
| 6,421,093 B1 | * | 7/2002 | Noga et al. | ................. 348/553 |

(Continued)

FOREIGN PATENT DOCUMENTS

JP    8-237653    9/1996

(Continued)

*Primary Examiner*—Trang Tran
(74) *Attorney, Agent, or Firm*—Frommer Lawrence & Haug LLP; William S. Frommer; Thomas F. Presson

(57) ABSTRACT

The present invention provides a television receiver which receives television signals to display images on a CRT display, and includes a JPEG decode unit (21) for decoding JPEG (Joint Photographic Experts Group) compressed image data. The JPEG decode unit (21) detects image size of image data after decode processing stored in JPEG compressed image data from a memory card (6). In case the image size is larger than image display area of a CRT display (3) and activity ratio of a memory unit (22) is larger than a limit value, the JPEG decode unit (21) sends the image size to a CPU (25), and concurrently decodes the JPEG compressed image data in the memory unit (22) to generate the image data, and clips away half of the image data along the vertical direction and the horizontal direction. The image data process unit (23) enlarges or reduces the image data so that the image data is displayed on substantially the whole image display area without changing the aspect ratio of the image data based on enlargement/reduction ratio which is determined by the CPU (25) by comparing the image size with the image display area of the CRT display (3).

9 Claims, 5 Drawing Sheets

U.S. PATENT DOCUMENTS 6,560,280 B1 * 5/2003 Shachar et al. ............. 375/240
6,882,752 B1 * 4/2005 Abe ........................... 382/250

FOREIGN PATENT DOCUMENTS

| JP | 11-289520 | 10/1999 |
| JP | 11-355683 | 12/1999 |
| WO | WO 99/65236 | 12/1999 |

* cited by examiner

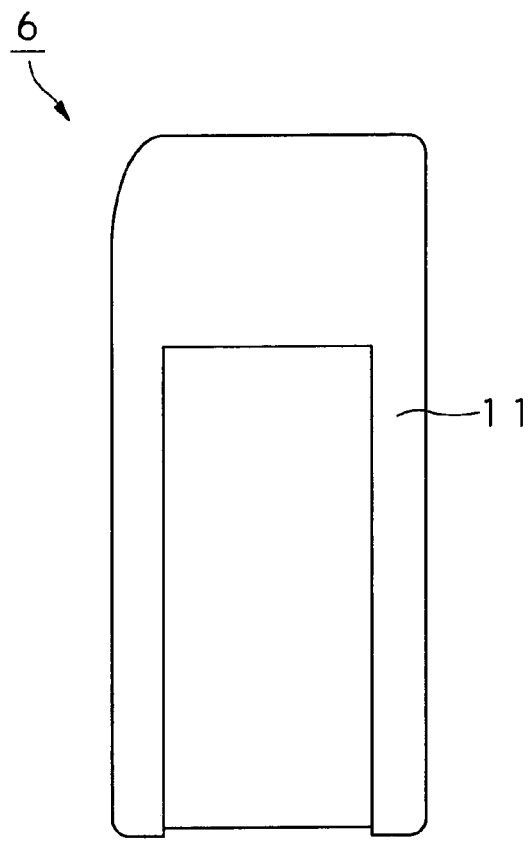
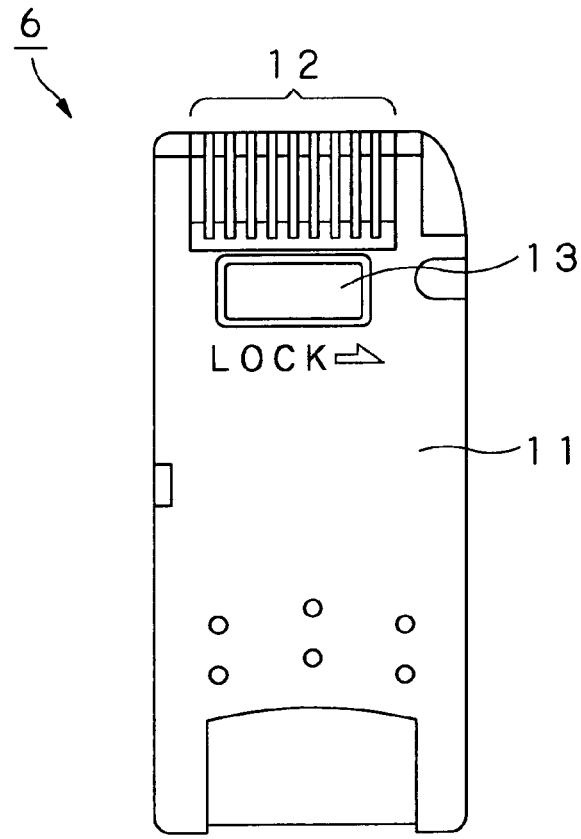
FIG.2A    FIG.2B
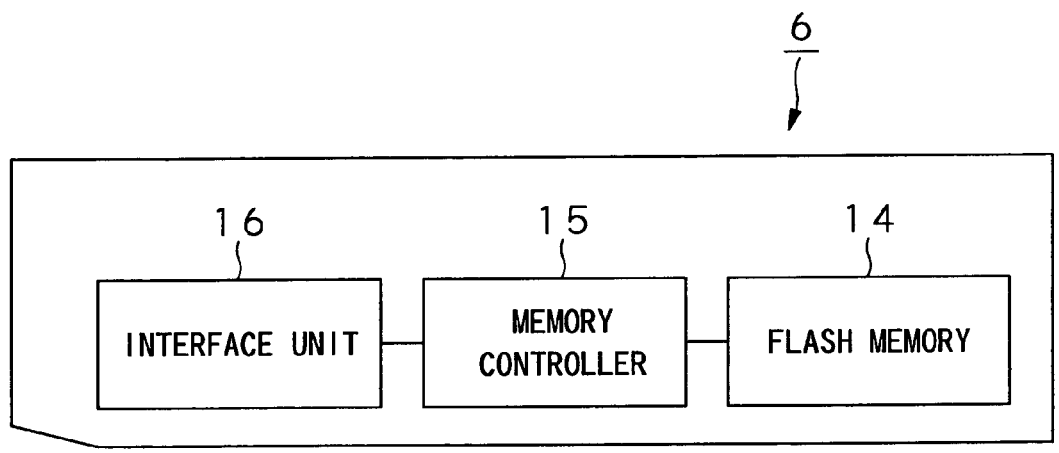
FIG.3

TELEVISION RECEPTION APPARATUS

TECHNICAL FIELD

The present invention relates to a television receiver, in particular, to a television receiver suitable in displaying compressed image data which is compressed under the discrete cosine transform such as the JPEG (Joint Photographic Experts Group) and the MPEG (Moving Picture Experts Group).

BACKGROUND ART

Recently, there are known television receivers which not only receive television signals to display images on a CRT (Cathode Ray Tube) display but also display image data which is written in a JPEG (Joint Photographic Experts Group) file, etc. output from a digital still camera or a personal computer.

Among such television receivers, there is known an HDTV (High Definition TV) provided with a CRT display having maximum pixels of 1920 pixels×1080 pixels (approximately 2 million pixels). Generally, since images may not be displayed on outer 10% –20% circumference of a CRT display screen, an area of 1632 pixels×918 pixels of a CRT display screen of an HDTV works as image display area which can really display images (effective display area).

So, an HDTV can display JPEG image data on a CRT display having the image display area of 1632 pixels×918 pixels.

Thus, when displaying JPEG image data of 2400 pixels× 1800 pixels (approximately 4.3 million pixels), which is larger than the image display area of 1632 pixels×918 pixels, on an HDTV, part of the image data cannot be covered and the whole image data cannot be undesirably displayed.

On the other hand, when displaying JPEG image data of 680 pixels×480 pixels (approximately 0.31 million pixels), which is smaller than the image display area of 1632 pixels×918 pixels, on an HDTV, even though the whole image data can be displayed, wide range of blank area is undesirably formed since the image data is small.

DISCLOSURE OF THE INVENTION

Accordingly, the present invention has an object to provide a new television receiver suitable in displaying compressed image data.

The present invention has another object to provide a television receiver which can display compressed image data which is compressed under a predetermined compression manner such as the JPEG on substantially the whole image display area of a display means with its circularity kept intact.

The above object can be attained by providing a television receiver which receives television signals to display images on a display means, which includes:

image data decode means for decoding input compressed image data which is compressed under a predetermined compression manner, and detecting image size of image data after decode processing;

comparison means for comparing the image size of the image data detected by the image data decode means with image display area of the display means; and image data process means for enlarging or reducing the image data based on the comparison result output from the comparison means so that the number of pixels of the image data along the vertical direction corresponds with the number of pixels of the image display area of the display means along the vertical direction, or that the number of pixels of the image data along the horizontal direction corresponds with the number of pixels of the image display area of the display means along the horizontal direction without changing the aspect ratio of the image size of the image data.

The television receiver further includes:

a detachable external recording medium of substantially a plate shape and image data reproduction control means for reading out compressed image data recorded in at least the external recording medium;

wherein the image data decode means receives compressed image data from the external recording medium through the image data reproduction control means.

According to the present invention, there is provided a television receiver which reads out compressed image data recorded in a detachable external recording medium of substantially a plate shape, and decodes thus read out compressed image data and detects image size of image data after decode processing, and compares the image size of the image data with image display area of a display means, and display the image data on substantially the whole image display area of the display means based on the comparison result without changing the aspect ratio of the image size of the image data.

These objects and other objects, features and advantages of the present invention will become more apparent from the following detailed description of the preferred embodiments of the present invention.

BRIEF DESCRIPTION OF THE DRAWINGS

FIG. 2A shows a top view of a memory card used in the HDTV, while FIG. 2B shows a bottom view thereof.

FIG. 3 shows a block diagram indicating internal configuration of the memory card.

BEST MODE FOR CARRYING OUT THE INVENTION

The embodiments of the present invention to be employed to an HDTV which corresponds to the HDTV broadcasting will further be described below with reference to the accompanying drawings.

Figure 1:
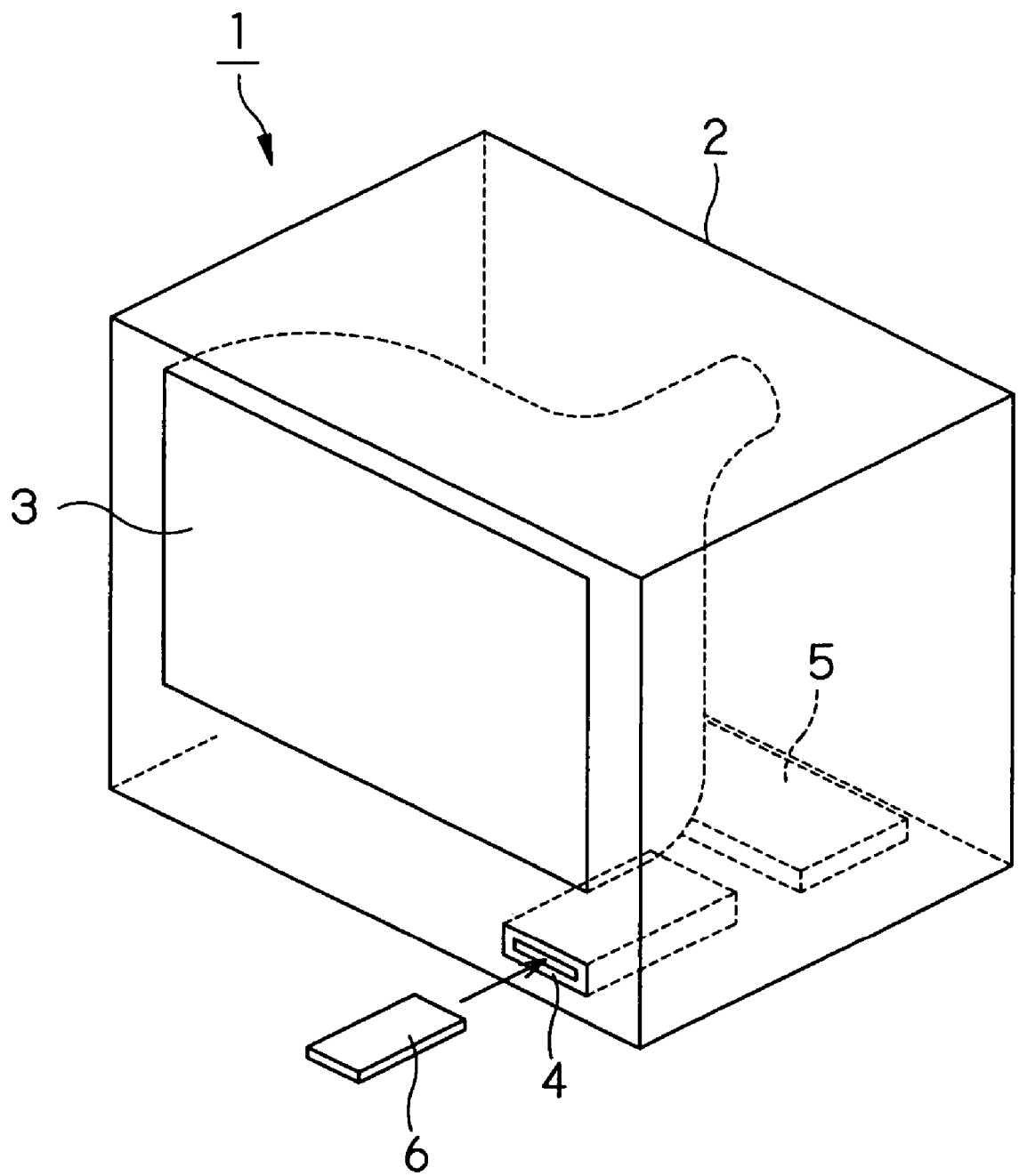
FIG. 1 shows configuration of a HDTV (High Definition TV) employing the present invention.

FIG. 1 shows an HDTV (High Definition TV) 1 employing the present invention which includes a housing 2 of substantially a box shape, and a CRT (Cathode Ray Tube) display (Braun tube) 3 for displaying various information whose display screen is located at the front surface of the housing 2. The HDTV 1 further includes at least a memory card driver 4 to which a memory card 6 being a detachable external recording medium of substantially a plate shape is to be installed, and a display control unit 5 for receiving data from the memory card 6 to display information on the CRT display 3. The memory card driver 4 has its slot located at the lower right side of the CRT display 3 so that the user can easily install the memory card 6 to the memory card driver 4.

The CRT display 3 has maximum pixels of 1920 pixels× 1080 pixels (approximately 2 million pixels), among which an area of 1632 pixels×918 pixels works as image display area which can really display images (effective display area).

The memory card 6 is a detachable semiconductor recording medium to/from which various data is written/read out, which can be installed to various electronic apparatuses for recording/reproducing data such as a personal computer, a video tape recorder, a digital still camera, etc. The memory card 6 has recorded therein various data such as JPEG compressed image data which is compressed under the JPEG (Joint Photographic Experts Group), MPEG compressed image data which is compressed under the MPEG (Moving Picture Experts Group), and MPEG audio data which is compressed under the MPEG, etc.

The memory card driver 4 reads out various data recorded in the installed memory card 6, and records various data to the memory card 6.

The display control unit 5 receives JPEG compressed image data, etc. read out from the memory card 6 by the memory card driver 4 to display information on the CRT display 3, and details of which will be explained hereinafter.

The memory card 6 will be explained in detail with reference to FIG. 2–FIG. 4. FIG. 2A shows a top view of the memory card 6, while FIG. 2B shows a bottom view of the memory card 6. As shown, the memory card 6 has a housing 11 whose longitudinal, transverse, and thickness dimensions are 50 mm, 21.5 mm, and 2.8 mm, respectively, and a terminal 12 provided with ten pins from/to which bus state indicative of the state of a serial bus when installed to the memory card driver 4, various data, and clocks are output/input. The memory card 6 further has an accidental-deletion prevention switch 13 to prevent deletion of recorded data which occurs by accident.

The memory card 6 has a flash memory 14 for recording various data through the memory card driver 4 whose storage capacity is several MB to scores of MB, a memory controller 15 for managing the content of the flash memory 14, and an interface unit 16 for receiving/sending various data which is to be connected to the memory card driver 4, as shown in FIG. 3.

The memory card 6 sends/receives data, clocks, and bus state between the memory card driver 4 using only three pins adopted for sending/receiving such data, clocks, and bus state out of the ten pins of the terminal 12. The clocks and bus state are sent from the memory card driver 4, and the data is sent/received between the memory card driver 4 under the two-way half duplex transmission. When sending/receiving control packets as data between the memory card driver 4, the memory card 6 sets the maximum frequency of clocks to be 20 MHz, and adds thereto error check codes on the basis of 512 byte unit.

In the memory card 6, the memory controller 15 processes in accordance with the serial interface protocol to control the flash memory 14.

In case the flash memory 14 of the memory card 6 consists of a plurality of flash memories, the memory controller 15 controls each flash memory. Also, in case the flash memory 14 of the memory card 6 consists of a plurality of various different flash memories, the memory controller 15 disposes property difference of the respective flash memories to control each flash memory, and performs error correction processing in accordance with error property of the respective flash memories. Furthermore, the memory controller 15 of the memory card 6 converts parallel data to serial data.

Since the memory controller 15 processes in accordance with the serial interface protocol, the memory card 6 can cope with any flash memories which exist presently or which will be produced in the future.

The memory card 6 employs hierarchical file system of the FAT (File Allocation Table) which is generally employed in a personal computer so as to manage files of the flash memory 14. The memory card 6 stores data of a plurality of kinds of formats such as still picture data, moving picture data, audio data (music data), voice data (speech data) into the flash memory 14 based on hierarchical file system of the FAT, and controls the content of the flash memory 14 using the memory controller 15. The memory card 6 stipulates file format and directory management manner in recording data to the flash memory 14 in advance every formatting of data, and manages data recorded in the flash memory 14 in accordance with the stipulation.

Figure 4:
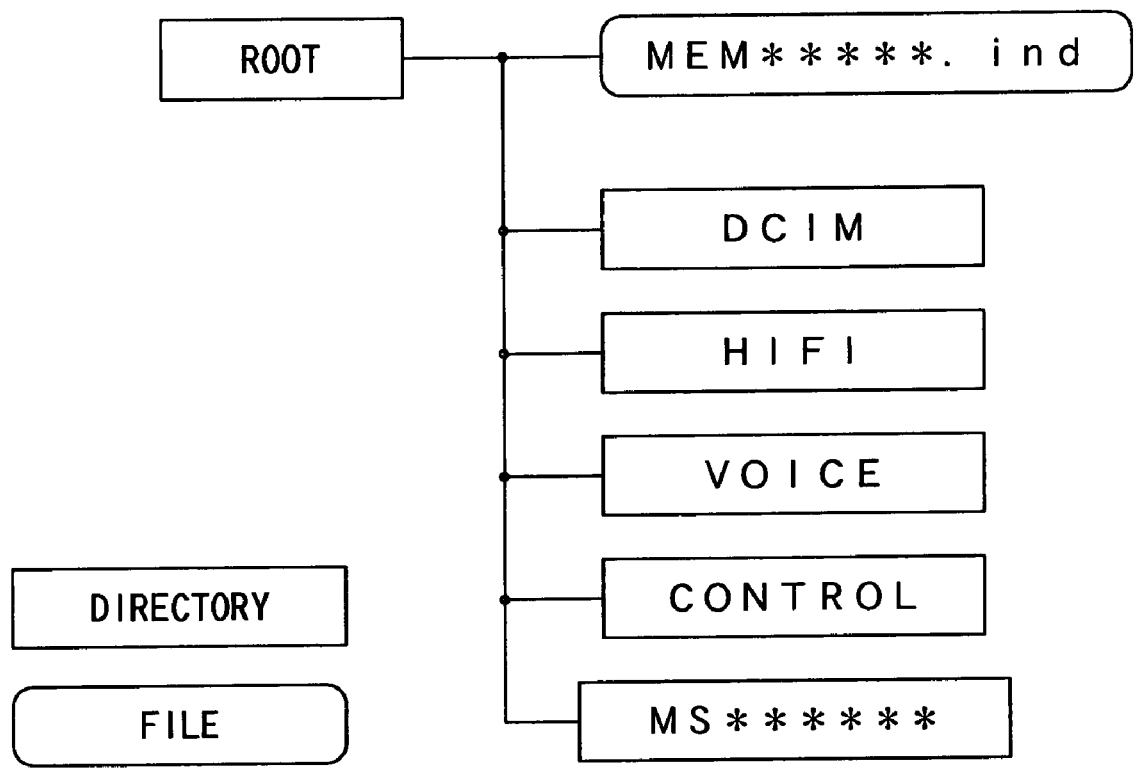
FIG. 4 shows a view for explaining directory management in the memory card.

Specifically, in the root directory of the flash memory 14, there are recorded "MEM***.ind" being a file which indicates the kind of the memory card 6, "DCIM" being a directory which stores still picture files, "HIFI" being a directory which stores audio files, "VOICE" being a directory which stores voice files, "CONTROL" being a directory which stores additional information files such as a control information file, and "MS****" being a directory which stores information peculiar to a vender, as shown in FIG. 4.

Furthermore, the memory card 6 employs the DCF (Design rule for Camera File system) standardized by the JEIDA (Japan Electronic Industry Development Association) as a format of still picture data, and employs the ADPCM (Adaptive Differential Pulse Code Modulation) of the ITU (International Telecommunications Union)-T recommendation G.726 as a format of audio data.

Thus, since the memory card 6 can be detachably used, JPEG compressed image data picked up by such as a digital still camera can be utilized in the HDTV 1.

Figure 5:
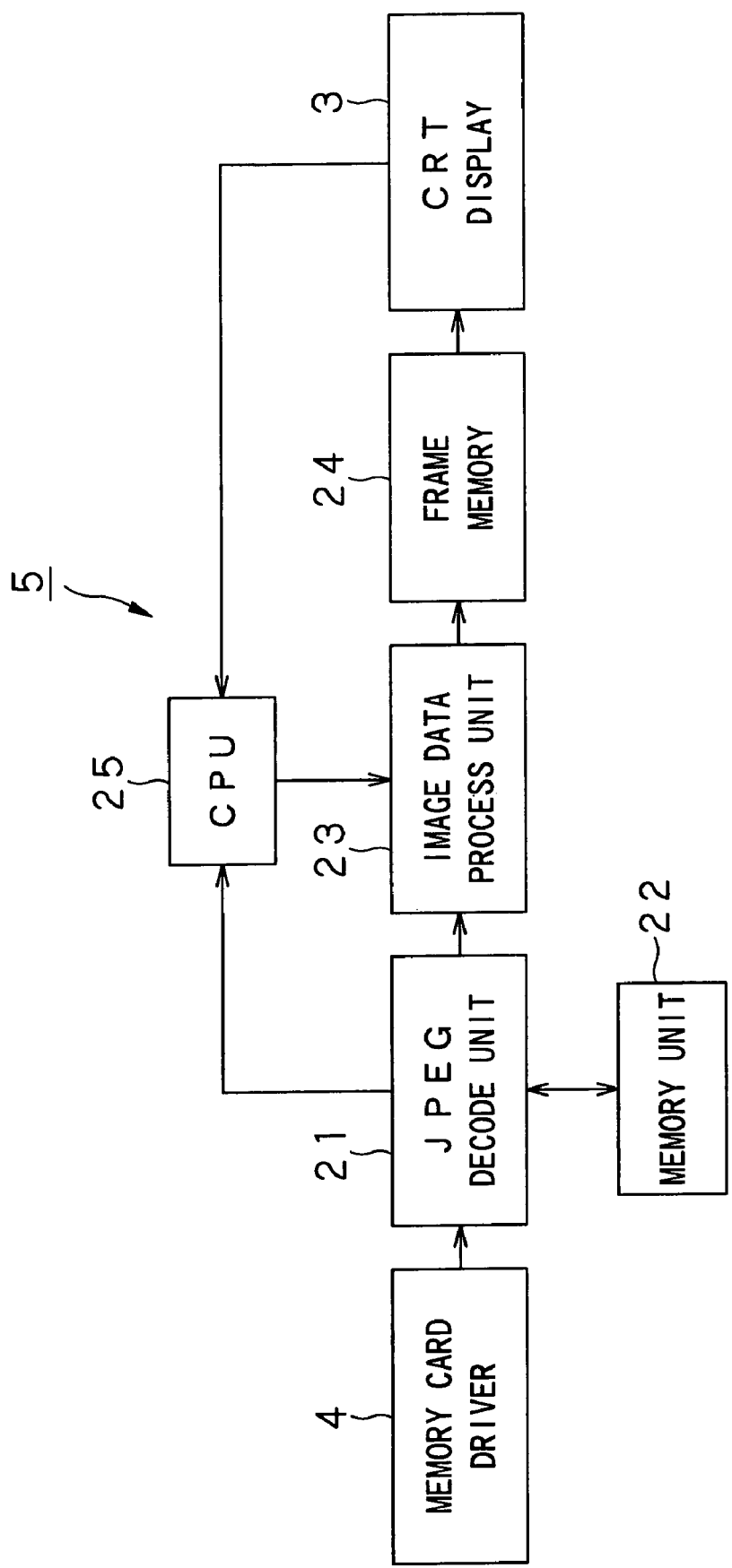
FIG. 5 shows a block diagram of a display control unit of the HDTV.

The configuration of the display control unit 5 will be explained in detail with reference to FIG. 5. The display control unit 5 includes a JPEG decode unit 21 for decoding input JPEG compressed image data, a memory unit 22 for temporarily storing decoded image data, an image data process unit 23 for enlarging or reducing image data, a frame memory 24 for string enlarged or reduced image data, and a CPU (Central Processing Unit) 25.

The JPEG decode unit 21 receives JPEG compressed image data recorded in the memory card 6 from the memory card driver 4. Then, the JPEG decode unit 21 detects the number of lines and the number of pixels per line of image data stored in the frame header of the JPEG compressed image data, that is, image size of the image data after decode processing to send thus detected image size to the CPU 25, and concurrently decodes the JPEG compressed image data in the memory unit 22 to generate the image data, and sends thus generated image data to the image data process unit 23.

At this time, in case the detected image size of the image data is larger than the image display area of the CRT display 3 and the activity ratio of the memory unit 22 calculated from the detected image size of the image data and storage capacity of the memory unit 22 is larger than a limit value determined in advance, the JPEG decode unit 21 clips away or removes part of the decoded image data which is decoded in the memory unit 22 along the vertical direction and the horizontal direction to reduce the image size, and sends thus reduced image data to the image data process unit 23, and concurrently sends thus reduced image size after the clip processing to the CPU 25.

The memory unit 22, which has a predetermined storage capacity, is work area of the JPEG decode unit 21 where JPEG compressed image data recorded in the memory card 6 is read out and decoded.

The CPU 25 compares the image size of the image data output from the JPEG decode unit 21 with the image display area of the CRT display 3, and determines enlargement/reduction ratio of the image data to send thus determined enlargement/reduction ratio to the image data process unit 23.

The image data process unit 23 enlarges or reduces the image data so that the number of pixels of the image data along the vertical direction corresponds with the number of pixels of the image display area of the CRT display 3 along the vertical direction, or that the number of pixels of the image data along the horizontal direction corresponds with the number of pixels of the image display area of the CRT display 3 along the horizontal direction based on the enlargement/reduction ratio of the image data determined by the CPU 25 without changing the aspect ratio of the image data from the JPEG decode unit 21, and stores thus enlarged or reduced image data into the frame memory 24, and sends the enlarged or reduced image data to the CRT display 3.

On the other hand, when enlarging the image data, the image data process unit 23 may interpolate new image data into the image data. Also, the image data process unit 23 causes the center of the enlarged or reduced image data to accord with the center of the CRT display 3.

Next, JPEG compressed image data of different image size to be sent to the display control unit 5 will be explained. For example, it is assumed that JPEG compressed image data whose image size after decode processing is 2400 pixels×1800 pixels (approximately 4.3 million pixels), 640 pixels×480 pixels (approximately 0.31 million pixels), 2400 pixels×1200 pixels (approximately 2.9 million pixels), and 640 pixels×360 pixels (approximately 0.23 million pixels) is sent to the display control unit 5.

JPEG compressed image data whose image size after decode processing is 2400 pixels×1800 pixels is larger than an area of 1632 pixels×918 pixels being the image display area of the CRT display 3. So, image data to be generated from the JPEG compressed image data cannot displayed on the image display area of the CRT display 3 with its circularity kept intact.

In that case, that is, in case the activity ratio of the memory unit 22 is larger than a limit value determined in advance when the JPEG compressed image data is read out to the memory unit 22 and decoded by the JPEG decode unit 21, specifically, decoded image data of 2400 pixels×1800 pixels has its half of the image data along the vertical direction and the horizontal direction clipped away to be of 1200 pixels×900 pixels (approximately 1.1 million pixels) so as to cause the decoded image data to be smaller than the image display area of the CRT display 3. Furthermore, since the image display area of the CRT display 3 is of 1632 pixels×918 pixels, thus reduced decoded image data is enlarged along the vertical direction and the horizontal direction by 1.02 times to be of 1224 pixels×918 pixels in the image data process unit 23 so that the number of pixels of thus enlarged image data along the vertical direction corresponds with the number of pixels of the image display area along the vertical direction.

On the other hand, in case there is no limit to the activity ratio of the memory unit 22, the JPEG compressed image data does not undergo clip processing in the JPEG decode unit 21. Since the image display area of the CRT display 3 is of 1632 pixels×918 pixels, decoded image data is reduced along the vertical direction and the horizontal direction by 0.51 times to be of 1224 pixels×918 pixels in the image data process unit 23 so that the number of pixels of thus reduced image data along the vertical direction corresponds with the number of pixels of the image display area along the vertical direction.

JPEG compressed image data whose image size after decode processing is 640 pixels×480 pixels is smaller than an area of 1632 pixels×918 pixels being the image display area of the CRT display 3. In this case, as the activity ratio of the memory unit 22 is low, the JPEG compressed image data does not undergo clip processing in the JPEG decode unit 21. Since the image display area of the CRT display 3 is of 1632 pixels×918 pixels, decoded image data is enlarged along the vertical direction and the horizontal direction by 1.9125 times to be of 1224 pixels×918 pixels in the image data process unit 23 so that the number of pixels of thus enlarged image data along the vertical direction corresponds with the number of pixels of the image display area along the vertical direction.

JPEG compressed image data whose image size after decode processing is 2400 pixels×1200 pixels is larger than an area of 1632 pixels×918 pixels being the image display area of the CRT display 3. So, image data to be generated from the JPEG compressed image data cannot displayed on the image display area of the CRT display 3 with its circularity kept intact.

In that case, that is, in case the activity ratio of the memory unit 22 is larger than a limit value determined in advance when the JPEG compressed image data is read out to the memory unit 22 and decoded by the JPEG decode unit 21, specifically, decoded image data of 2400 pixels×1200 pixels has its half of the image data along the vertical direction and the horizontal direction clipped away to be of 1200 pixels×600 pixels (approximately 0.72 million pixels) so as to cause the decoded image data to be smaller than the image display area of the CRT display 3. Furthermore, since the image display area of the CRT display 3 is of 1632 pixels×918 pixels, thus reduced decoded image data is enlarged along the vertical direction and the horizontal direction by 1.36 times to be of 1632 pixels×792 pixels in the image data process unit 23 so that the number of pixels of thus enlarged image data along the horizontal direction corresponds with the number of pixels of the image display area along the horizontal direction.

On the other hand, in case there is no limit to the activity ratio of the memory unit 22, the JPEG compressed image data does not undergo clip processing in the JPEG decode unit 21. Since the image display area of the CRT display 3 is of 1632 pixels×918 pixels, decoded image data is reduced along the vertical direction and the horizontal direction by 0.68 times to be of 1632 pixels×792 pixels in the image data process unit 23 so that the number of pixels of thus reduced image data along the horizontal direction corresponds with the number of pixels of the image display area along the horizontal direction.

JPEG compressed image data whose image size after decode processing is 640 pixels×360 pixels is smaller than an area of 1632 pixels×918 pixels being the image display area of the CRT display 3. In this case, as the activity ratio of the memory unit 22 is low, the JPEG compressed image data does not undergo clip processing in the JPEG decode unit 21. Since the image display area of the CRT display 3 is of 1632 pixels×918 pixels, decoded image data is enlarged along the vertical direction and the horizontal direction by 2.55 times to be of 1632 pixels×918 pixels in the image data process unit 23 so that the number of pixels of thus enlarged image data along the horizontal direction corresponds with the number of pixels of the image display area along the horizontal direction.

Figure 6:
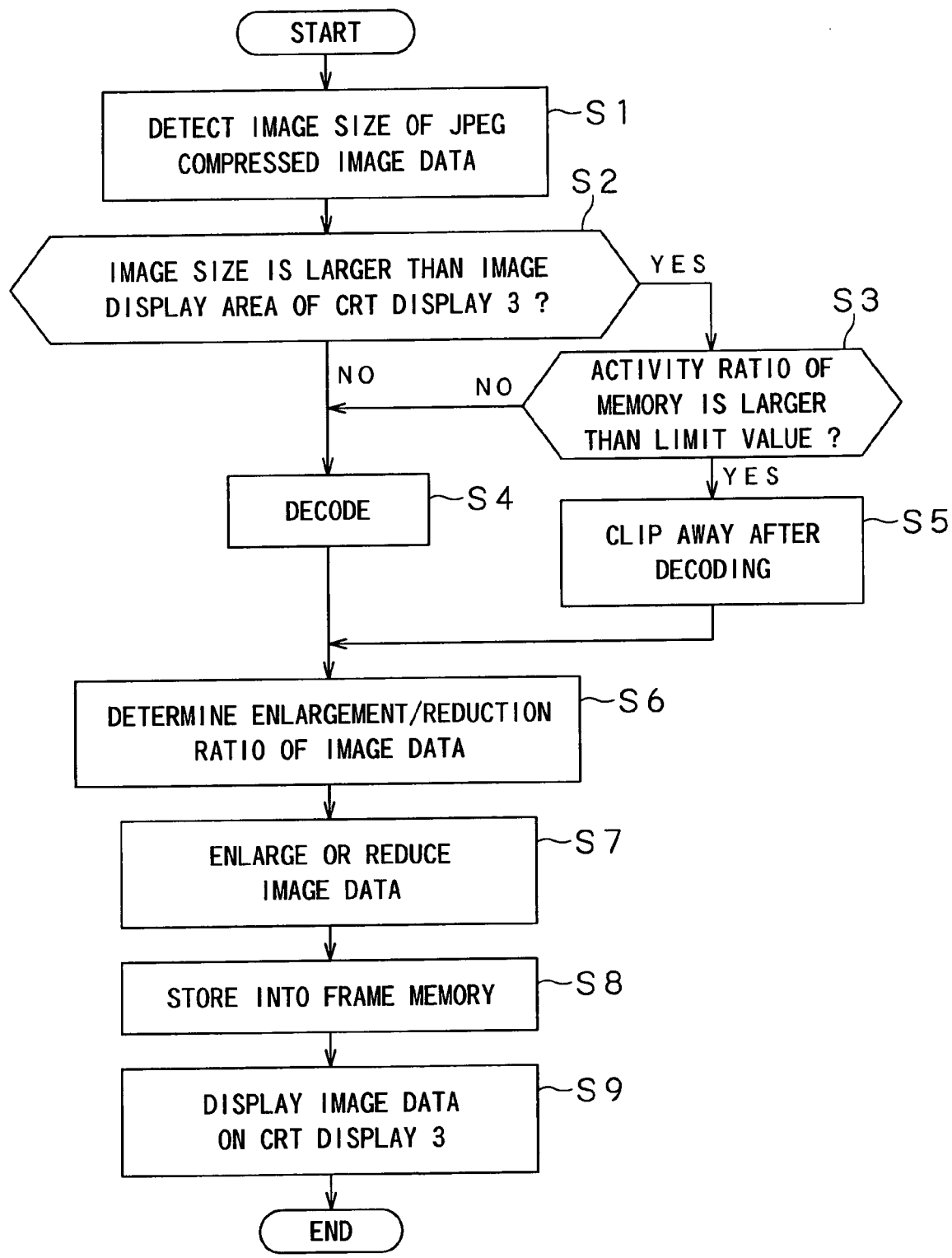
FIG. 6 shows a flow chart of display processing of the HDTV in which JPEG compressed image data is displayed on a CRT display.

Next, the processing of the HDTV 1 which decodes JPEG compressed image data recorded in the memory card 6 installed to the memory card driver 4, and displays thus decoded image data on the CRT display 3 will be explained with reference to a flow chart shown in FIG. 6.

In step S1, the JPEG decode unit 21 receives JPEG compressed image data recorded in the memory card 6, and detects image size of image data after decode processing stored in the frame header of the JPEG compressed image data.

In step S2, the JPEG decode unit 21 judges whether or not thus detected image size of the image data is larger than the image display area of the CRT display 3. In case the detected image size of the image data is larger than the image display area of the CRT display 3, the processing proceeds to step S3, while in case not, the processing proceeds to step S4.

In step S3, the JPEG decode unit 21 judges whether or not the activity ratio of the memory unit 22 calculated from the detected image size of the image data and storage capacity of the memory unit 22 is larger than a limit value determined in advance. In case the activity ratio of the memory unit 22 is larger than the limit value, the processing proceeds to step S5, while in case not, the processing proceeds to step S4.

In step S4, the JPEG decode unit 21 sends the detected image size of the image data to the CPU 25, and concurrently decodes the JPEG compressed image data in the memory unit 22 to generate the image data, and sends thus generated image data to the image data process unit 23.

In step S5, the JPEG decode unit 21 sends the detected image size of the image data to the CPU 25, and concurrently decodes the JPEG compressed image data in the memory unit 22 to generate the image data, and furthermore clips away half of the image data along the vertical direction and the horizontal direction to reduce the image size to a quarter thereof so as to cause the decoded image data to be smaller than the image display area of the CRT display 3, and sends thus reduced image data to the image data process unit 23.

In step S6, the CPU 25 compares the image size of the received image data with the image display area of the CRT display 3, and determines enlargement/reduction ratio of the image data to send thus determined enlargement/reduction ratio to the image data process unit 23.

In step S7, the image data process unit 23 enlarges or reduces the image data so that the number of pixels of the image data along the vertical direction corresponds with the number of pixels of the image display area of the CRT display 3 along the vertical direction, or that the number of pixels of the image data along the horizontal direction corresponds with the number of pixels of the image display area of the CRT display 3 along the horizontal direction based on the enlargement/reduction ratio of the image data determined by the CPU 25 without changing the aspect ratio of the image data from the JPEG decode unit 21.

In step S8, the image data process unit 23 stores thus enlarged or reduced image data into the frame memory 24.

In step S9, the image data process unit 23 causes the center of the image data written in the frame memory 24 to accord with the center of the CRT display 3, and displays the image data on the image display area of the CRT display 3.

As in the above, the HDTV 1 according to the present invention receives various JPEG compressed image data which is recorded by a digital still camera, a personal computer, etc. and whose image size after decode processing is different from the memory card 6, and enlarges or reduces the image data so that the number of pixels of the image data along the vertical direction corresponds with the number of pixels of the image display area of the CRT display 3 along the vertical direction, or that the number of pixels of the image data along the horizontal direction corresponds with the number of pixels of the image display area of the CRT display 3 along the horizontal direction without changing the aspect ratio of the decoded image data, or with the circularity kept intact.

Thus, the HDTV 1 can display the JPEG compressed image data recorded in the memory card 6 on substantially the whole image display area of the CRT display 3, which enables the user to watch TV programs without feeling incongruity.

The present invention is not limited to above-described preferred embodiment, and it should be understood by those ordinarily skilled in the art that various modifications, alternative constructions or equivalents can be implemented without departing from the scope and spirit of the present invention.

For example, in above-described embodiments, the CPU 25 compares the image size of the image data output from the JPEG decode unit 21 with the image display area of the CRT display 3 and determines enlargement/reduction ratio of the image data, while the enlargement/reduction ratio of the image data may be determined using a conversion table prepared in advance which relates the image size of the image data with the enlargement/reduction ratio.

Furthermore, according to the HDTV 1 employing the present invention, the JPEG decode unit 21 decodes JPEG compressed image data and displays image data on the CRT display 3, while an MPEG decode unit replacing the JPEG decode unit 21 may be arranged to decode MPEG compressed image data and display image data on the CRT display 3.

INDUSTRIAL APPLICABILITY

As has been described above, according to the present invention, there is provided a television receiver which decodes compressed image data which is compressed under a predetermined compression manner and detects image size of image data after decode processing, and compares the image size of the image data with image display area of a display unit, and display the image data on substantially the whole image display area of the display unit based on the comparison result without changing the aspect ratio of the image size of the image data, which enables the user to watch TV programs without feeling incongruity.

The invention claimed is:

1. A television receiver comprising:
   image data decode means for decoding input compressed image data which is compressed under a predetermined compression manner, and detecting image size of image data after decode processing;
   comparison means for comparing the image size of the image data detected by the image data decode means with image display area of the display means;
   image data process means for modifying the image data based on the comparison result output from the comparison means so that the modified image data corresponds with the number of pixels of the image display area which is determined in advance without changing the aspect ratio of the image size of the image data; and temporary storage means for temporarily storing the image data decoded by the image data decode means, wherein the image data decode means clips away part of the image data in accordance with storage capacity of the temporary storage means, and stores reduced image data in the temporary storage means, wherein the image data process means modifies the image data so that the number of pixels of the image data along the vertical direction corresponds with the number of pixels of the image display area of the display means along the vertical direction, or that the number of pixels of the image data along the horizontal direction corresponds with the number of pixels of the image display area of the display means along the horizontal direction without changing the aspect ratio of the decoded image data.

2. The television receiver as set forth in claim 1, further comprising:
a detachable external recording medium of substantially a plate shape and image data reproduction control means for reading out compressed image data recorded in at least the external recording medium;
wherein the image data decode means receives compressed image data from the external recording medium through the image data reproduction control means.

3. The television receiver as set forth in claim 2, wherein the external recording medium is a semiconductor recording medium.

4. The television receiver as set forth in claim 1, wherein the image data process means enlarges the image data without interpolating new image data into the image data.

5. The television receiver as set forth in claim 1, wherein the image data process means causes the center of the enlarged or reduced image data to accord with the center of the display means.

6. The television receiver as set forth in claim 1, further comprising:
storage means for storing the image data modified by the image data process means.

7. The television receiver as set forth in claim 1, wherein the compressed image data conforms to the JPEG (Joint Photographic Experts Group).

8. The television receiver as set forth in claim 1, wherein the compressed image data conforms to the MPEG (Moving Picture Experts Group).

9. A method for receiving television signals, comprising the steps of:
decoding input compressed image data compressed under a predetermined compression manner;
detecting image size of image data after decode processing;
comparing the image size of the image data detected with image display area;
modifying the image data based on the comparison result so that the modified image data corresponds with the number of pixels of the image display area which is determined in advance without changing the aspect ratio of the image size of The image data; and
temporarily storing the image data decoded;
wherein the decoding step clips away part of the image data and stores thus reduced image data,
wherein modifying the image data so that the number of pixels of the image data along the vertical direction corresponds with the number of pixels of the image display area along the vertical direction, or that the number of pixels of the image data along the horizontal direction corresponds with the number of pixels of the image display area along the horizontal direction without changing the aspect ratio of the decoded image data.

* * * * *